(12) United States Patent
Farley et al.

(10) Patent No.: US 8,926,415 B2
(45) Date of Patent: Jan. 6, 2015

(54) DEPTH ADJUSTABLE CROP TRANSPORT VANE

(75) Inventors: Herb M. Farley, Elizabethtown, PA (US); Bart M. A. Missotten, Winksele (BE)

(73) Assignee: CNH Industrial America LLC, New Holland, PA (US)

( * ) Notice: Subject to any disclaimer, the term of this patent is extended or adjusted under 35 U.S.C. 154(b) by 161 days.

(21) Appl. No.: 13/348,095

(22) Filed: Jan. 11, 2012

(65) Prior Publication Data

US 2013/0178255 A1 Jul. 11, 2013

(51) Int. Cl.
*A01F 12/24* (2006.01)

(52) U.S. Cl.
USPC ............. 460/107; 460/71; 460/72; 460/110

(58) Field of Classification Search
USPC .............. 460/59, 62, 66, 71, 72, 78, 84, 460/107–110, 121, 122; 56/341
See application file for complete search history.

(56) References Cited

U.S. PATENT DOCUMENTS

| | | | | |
|---|---|---|---|---|
| 1,334,910 | A | | 3/1920 | Kuntz |
| 2,457,259 | A | * | 12/1948 | Moll ............................ 460/110 |
| 4,244,380 | A | | 1/1981 | DePauw et al. |
| 4,711,075 | A | | 12/1987 | Strong |
| 5,489,239 | A | | 2/1996 | Matousek et al. |
| 5,769,711 | A | * | 6/1998 | Roberg ........................... 460/73 |
| 5,913,724 | A | | 6/1999 | Roberg |
| 5,928,079 | A | * | 7/1999 | Roberg ........................... 460/83 |
| 6,231,439 | B1 | | 5/2001 | Heidjann |
| 6,958,012 | B2 | | 10/2005 | Duquesne et al. |
| 7,473,170 | B2 | | 1/2009 | McKee et al. |

FOREIGN PATENT DOCUMENTS

DE 4218610 A1 12/1993
EP 92599 A1 11/1983

* cited by examiner

*Primary Examiner* — Alicia Torres
(74) *Attorney, Agent, or Firm* — Seyed V. Sharifi T.; Patrick M. Sheldrake

(57) ABSTRACT

A depth adjustable crop transport vane, crop transport vane assembly, and agricultural combine threshing chambers employing such adjustable crop transport vanes are disclosed.

15 Claims, 6 Drawing Sheets

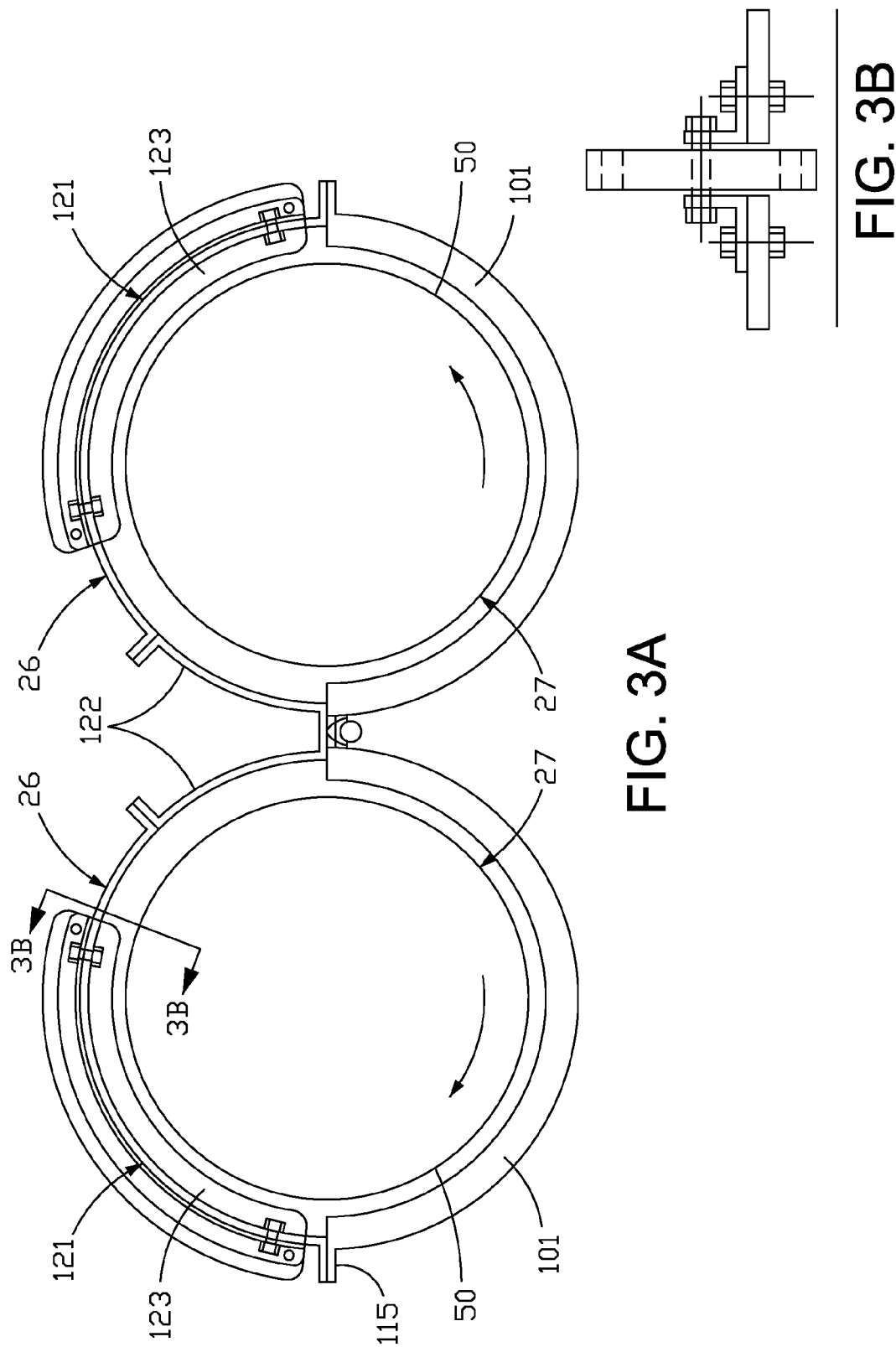

DEPTH ADJUSTABLE CROP TRANSPORT VANE

BACKGROUND OF THE INVENTION

The present invention relates to crop transport vanes and agricultural threshing and separating chambers employing them.

The time the crop resides in the threshing and separation chamber of a modern agricultural combine determines (mainly) the threshing losses, the straw breakage and the MOG (matter other than grain) separation to the cleaning system but also the power consumption. Different threshing conditions (tough wet crop vs. dry brittle crop) would benefit from different residence time in the threshing area in particular, to minimize grain loss, power consumption, etc.

On many modern combines, crop transport vanes are used to make sure the crop is transported to the back of the machine with desired residence times. Theses vanes, in combination with rotor elements (rasp bars, agitator pins, paddles, etc.) together with the rotor speed and crop properties like humidity, length of the straw determine the time the crop resides in the rotors. The current position and height of the vanes on the rotor covers are based on experience and must be seen as an average result for different crops and harvest conditions. In current machines, the height of the vanes is static, determined and set at the time of manufacture and installation. The angle of the vanes, in some instances is adjustable, although with some difficulty.

In some current embodiments, crop transport vanes are constructed from a rolled stainless steel angle. The vanes are bolted in place to a cylindrical housing in a helical arrangement to facilitate moving crops through the threshing chamber. The helical cage vane typically has three positions in which the vane can be bolted in place at three bolt locations on each vane to provide varying material transport speeds. By altering the angle of the vane relative to the direction of crop flow, crop flow can be sped up or slowed down as desired. The curvature from the helical shape of the vane does not conform well to each of the three different angular positions within the tubular threshing chamber. Thus, when adjusted the vane often does not mate well with the curvature of the threshing chamber; extra force or tightening of the bolts is required to force the vane into proper curvature. Each vane needs to be individually adjusted and secured with three bolts.

U.S. Pat. No. 4,244,380 recognizes the tediousness of adjusting each vane and proposes an apparatus whereby a single lever can adjust the angular positioning of the vanes. The '380 patent also recognizes that the vanes, once repositioned, no longer conform to the inner curvature of the rotor cover and that it is necessary to tighten the nuts and bolts to draw the vanes into a configuration corresponding to the curvature of the threshing chamber. Thus, while the '380 device addresses the simultaneous adjustment of the angle of the vanes, it still requires first loosening each of three bolts on each vane and then retightening those bolts upon readjustment to maintain the appropriate curvature.

These adjustments, even in the improved design take valuable time. Accordingly, more and better ways of adjusting the crop transport speed within the threshing chamber are sought after. Applicants have invented just that.

SUMMARY

Some embodiments provide a crop transport vane assembly comprising a housing comprising a sidewall defining a slot through the housing; a planar transport vane sized and configured for insertion into and through the slot between a secured deployed position and a secured undeployed position and one or more secured positions therebetween.

Some embodiments provide, the crop transport vane assembly further comprises a base portion for engaging and securing to a rotor cover of a threshing chamber wherein the sidewall is provided with a locking mechanism for holding the planar transport vane at the desired position.

In some embodiments, the planar transport vane defines an inner edge which approximates the curvature of the threshing chamber.

In some embodiments, the planar transport vane is pivotally attached within the slot to one end of the housing; wherein the planar transport vane is adapted to be secured to the housing, at an opposite end, at an adjustable depth.

In some embodiments, the planar transport vane is displaceable radially within and through the housing with respect to the central axis of the threshing chamber.

In some embodiments, the locking mechanism comprises a series of holes at the adjustable end of the vane, each corresponding to a desired position, in combination with a corresponding hole in the housing sidewall and a locking pin which may be removably secured within one of the series of holes in the vane and the hole in the housing.

In some embodiments, the locking mechanism comprises a clamp for securing the planar transport vane at a desired location within the housing.

Some embodiments provide a threshing chamber comprising a generally cylindrical rotor cover defined by a side wall further defining a plurality of slots passing therethrough and arranged either as a plurality of rings or as a helix extending along at least a portion of the length of the cylindrical rotor cover; a plurality of crop transport vane assemblies described herein, wherein each of the crop transport vane assemblies is positioned at a corresponding slot of the plurality of slots for selective displacement of the planar transport vane therethrough between a secured undeployed position and a secured deployed position and one or more secured positions therebetween.

In some embodiments, each of the crop transport vanes comprises: a planar transport vane defining an inner edge, wherein the inner edge approximates the curvature of the inside diameter of the cylindrical rotor cover; wherein the crop transport vane is positioned such that at least a portion of the inner edge is selectively displaceable inwardly extending through the sidewall to a desired depth.

In some embodiments, the crop transport vane is selectively displaceable inwardly extending through the sidewall such that at least a portion of the vane extends to a desired depth of approximately 0 inches to approximately 3 inches.

In some embodiments, each planar transport vane defines an inner edge, an outer edge, and two side edges; wherein the inner edge approximates the curvature of the inside diameter of the cylindrical rotor cover; wherein the each crop transport vane is positioned such that at least a portion of the inner edge is selectively displaceable inwardly extending through the sidewall to a desired depth.

In some embodiments, the planar transport vane is displaceable in a radial direction, with respect to the center axis of the cylindrical rotor cover.

In some embodiments, each the vane comprises: a planar transport vane having a pivot end and an adjustable end, the pivot end being affixed to the cage for rotation of the vane through one of the plurality of slots and the adjustable end being selectively securable at a desired depth extending into the interior of the rotor cover.

In some embodiments, the adjustable end of the vane comprises an arcuate shape such that as the vane rotates within its corresponding slot, the adjustable end is maintained within close proximity to the edge of the slot.

In some embodiments, the threshing chamber is further provided with an eccentric shaft connected to one or more of the crop transport vanes, such that rotation of the eccentric shaft results in displacement of the one or more crop transport vanes to achieve remote adjustment of the crop transport vane depth.

In some embodiments, a plurality of crop transfer vanes are connected to the eccentric shaft for simultaneous, remote adjustment of the depth of the plurality of crop transport vanes.

In some embodiments, the eccentric shaft is rotatable via either a mechanical linkage, or a motor.

BRIEF DESCRIPTION OF THE DRAWING FIGURES

FIG. 3A is an end view of an exemplary threshing chamber of an agricultural combine showing depth variable vanes in accordance with some embodiments.

FIG. 3B is a partial cross-section taken along line 3B-3B of FIG. 3A.

DETAILED DESCRIPTION OF EXEMPLARY EMBODIMENTS OF THE INVENTION

The terms "grain", "straw", and "tailings" are used principally within this specification for convenience as it is to be understood that these terms are not intended to be limiting, thus, "grain" refers to that part of the crop material which is threshed and separated from the discardable part of the crop material which is referred to as "straw". Incompletely threshed crop material is referred to as "tailings". Also the terms "forward", "rearward", "left" and "right", when used in connection with the combine harvester and/or components thereof are determined with reference to the direction of forward operative travel of the combine harvester, but again, they should not be construed as limiting. The terms "longitudinal" and "transverse" are determined with reference to the fore-and-aft direction of the harvester and are equally not to be construed as limiting.

Figure 1:
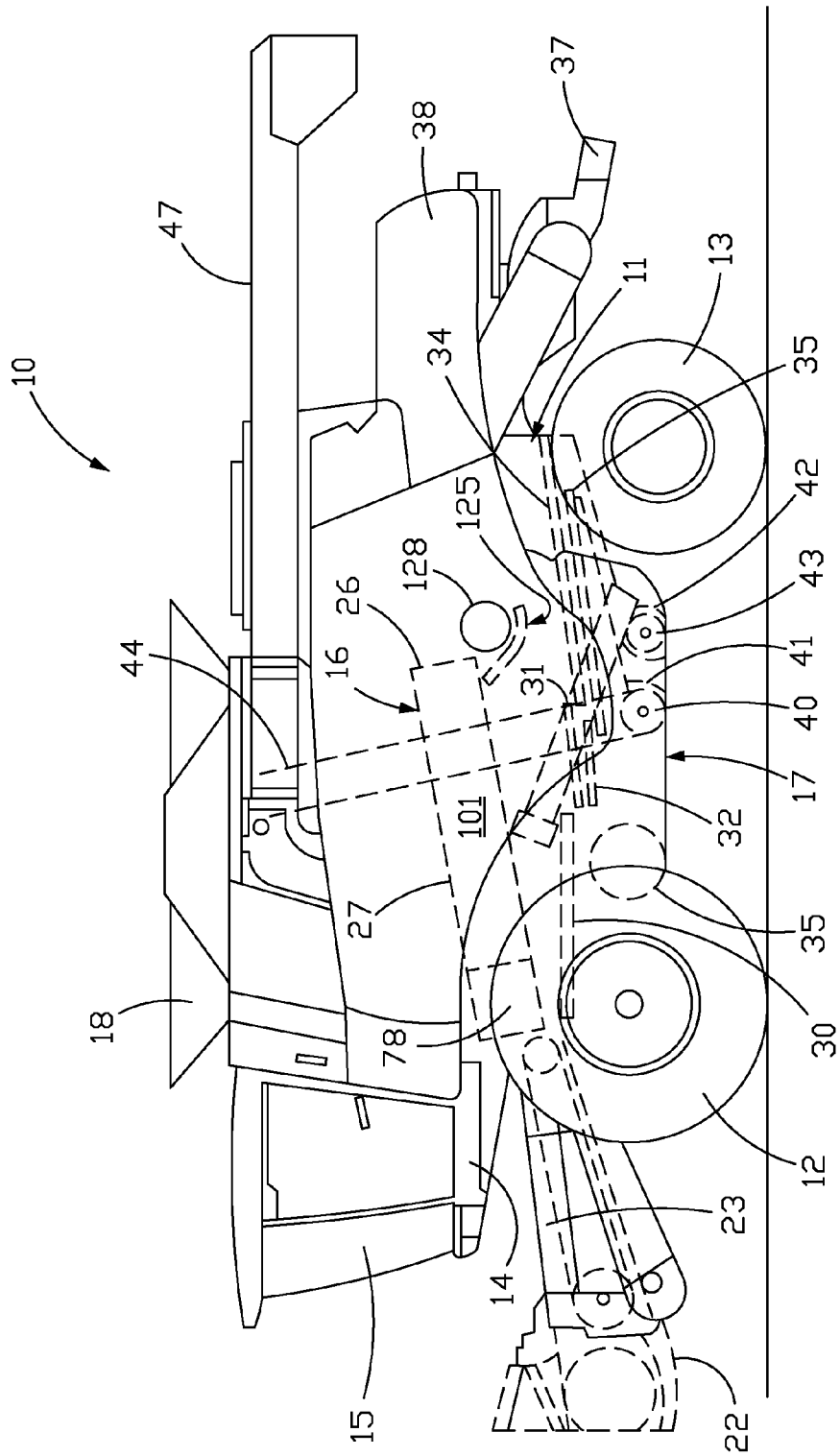
FIG. 1 is a side view of an exemplary agricultural combine.

The combine harvester 10 shown in FIG. 1 of the accompanying drawings is of the axial flow type, wherein crop material is threshed and separated while it is advanced by and along a longitudinally arranged rotor. The combine harvester comprises a chassis or main frame 11 having a pair of driven, ground-engaging front wheels 12 and a pair of smaller, steerable rear wheels 13. Supported on the main frame 11 are an operator's platform 14 with an operator's cab 15, a threshing and separating assembly 16, a grain cleaning assembly 17, and a grain tank 18. A conventional header 22 and straw elevator 23 extend forwardly of the main chassis 11 and are pivotally secured thereto for generally vertical movement which is controlled by appropriate actuators, such as hydraulic cylinders (not shown).

The header and the straw elevator 23 supply the cut crop to the threshing and separating assembly 16. The threshing and separating assembly 16 comprises a pair of juxtaposed, generally cylindrical chambers 26 in which rotors 27 are rotated to thresh and separate the crop received therein, that is to say, the crop is rubbed and beaten between the rotors 27 and the inner surfaces of the chambers 26. Thereby the grain, seed or the like is loosened and separated from the straw, stalk or cob. The chambers are described in further detail hereinafter.

Grain which has been separated by the threshing and separating assembly 16 falls onto a first grain pan 30 of the cleaning assembly 17 which further also comprises a pre-cleaning sieve 31, positioned above a second grain pan 32, a pair of sieves 33 and 34, disposed one above the other, and a cleaning fan 35.

The grain pans 30, 32 and the sieves 31, 33, and 34 are oscillated generally back-and-forth for transporting threshed and separated grain from the first grain pan 30 to the pre-cleaning sieve 31 and the second grain pan 32 and therefrom to the sieves 33, 34. The same oscillatory movement spreads the grain across the sieves 31, 33, and 34, while permitting the passage of cleaned grain by gravity through the apertures of these sieves. The grain on the sieves 31, 33, 34 is subjected to a cleaning action by the fan 35 which provides an airflow through said sieves to remove chaff and other impurities such as dust from the grain by making this material airborne for discharge from the machine through an outlet 37 of the straw hood 38. Clean grain falls to a clean grain auger 40 in a clean grain auger trough 41 and is subsequently transferred therefrom by a grain elevator 44 to the grain tank 18 for discharge out of unloading tube 47. Tailings fall to a tailings auger (not shown) in a tailings auger trough 42. The tailings are transported sideways by tailings auger to a separate rethresher 43 and returned by a tailings conveyor to the cleaning assembly 17 for repeated cleaning action. The description above is meant for general and environmental purposes to provide a better understanding of the equipment. The invention is not in any way limited to the specific embodiment described herein.

Figure 2:
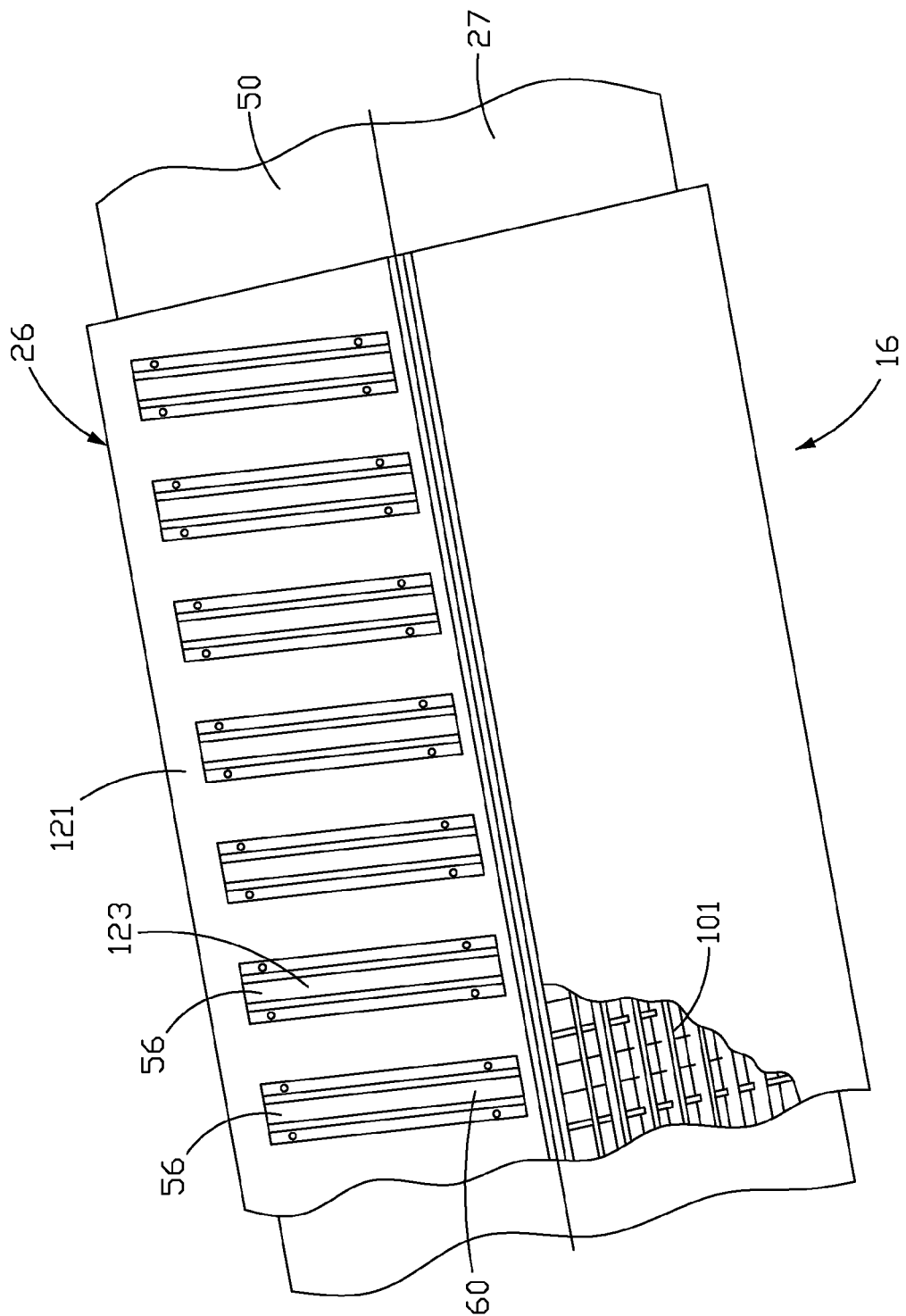
FIG. 2 is a partial side cross-sectional view of a threshing chamber of an exemplary agricultural combine.

Referring now to FIGS. 2, 3A and 3B the lower part of the chamber 26 of the threshing and separating assembly 16 comprises a plurality of concaves or grates 101 allowing the passage of threshed and separated grain to the cleaning assembly 17. The front portion of assembly 16 has a threshing concave assembly 78.

The upper section of the threshing and separating chamber 26 comprises curved cover plates 121. The cover plates 121 extend between and are bolted to the longitudinal profiles 115 and inner side walls 122 of the separating chambers 26 as denoted for example in FIG. 3. Each cover plate 121 is provided at its inner surface with a set of crop transport vanes 123, 56, 60. The vanes 123, 56, 60 guide the threshed crop material rearwardly as it is rotated by elements (not shown) on the rotor tube 50. A space of about two inches in many current embodiments is defined between the stationary cylindrical rotor cover, and the rotor tube 50. Crop flows between the two.

In some embodiments of the invention, at least some of these vanes are adjustable with respect to the depth to which they are inserted into the chamber (i.e. intrusion). In some embodiments, the pitch angle a of the vanes is also adjustable.

The pitch angle α at which the vanes 123 are disposed is known to affect grain loss and power requirements. This angle defines, to some extent, and previously it was thought to a large degree, the axial speed at which the crop material travels along the confines of the chamber 26, it also defines the dwelling time of the crop in the separating area, i.e., adjacent the separating grates 101. A smaller pitch angle α will lower the axial speed of the grain and hence increase the opportunity for the grains to travel through the grates in concave 101 and reach the cleaning assembly 17. Accordingly, it may be expected that a smaller percentage of the harvested grain will be lost by reaching the end of the threshing and separating chamber 26 without being separated from the straw and hence be deposited together with the straw through the harvester outlet 37 onto the field. Hence, it may be expected than grain losses at the end of the rotor 27 can be reduced by simply reducing the pitch angle α.

On the other hand, the pitch angle will influence the energy requirements for the rotation of the rotor 27. A smaller pitch angle increases the dwelling time and hence the amount of material present around the rotor tube 50. Hence it may be expected that a smaller pitch angle a will raise the energy requirements for keeping the rotor 27 rotating at full speed.

As noted above, prior designs employ several helically displaced crop vanes that may be angularly adjusted to adjust crop flow speed. Heretofore, the depth of the crop vane has been static and controlled by the factory at the time of manufacture or during replacement of the vanes.

During field evaluations it was determined that, in addition to changes in vane angle, the transport speed of crop flow through the rotor can be affected by removing the cage vanes completely. Thus, rather than changing the angular disposition of the cage vane, a similar effect could be accomplished by simply changing the insertion depth of the vane into the cage. A fully inserted vane provides a fast transport speed. As the vane is retracted, it imparts less directional influence on the rotating crop and therefore reduces transport speed. The slowest transport action is achieved through complete retraction. The key function of the vane is to change the crop speed flowing in the cylindrical chamber.

Accordingly, described herein is a new transport vane construction, and a new threshing and/or separation assembly and combine employing such a design. Regardless of the construction specifics, the vane is depth adjustable, where full insertion equates to greater transport speed and full retraction equates to reduced transport speed.

Adjustable insertion of the vane can be accomplished in any suitable fashion. In particular, a pivotable vane or a linearly adjustable vane may be employed. Other variants which one skilled in the art may recognize may also be used.

Figure 5:
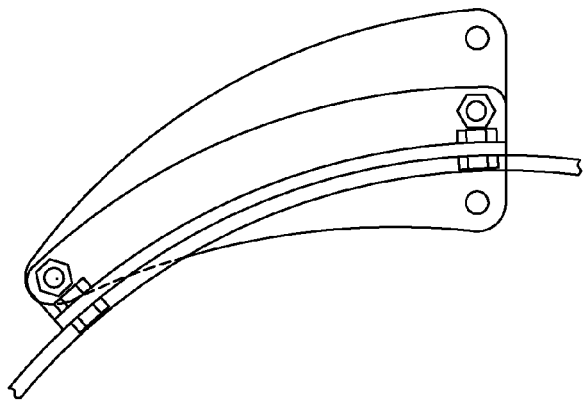
FIG. 5 is a cross-sectional view of a single vane in accordance with some embodiments described herein.

In some embodiments, the adjustable vane is pivotally secured to the threshing chamber at one end, such that by pivoting the vane, its depth can be controlled. FIG. 5 depicts such an arrangement.

Figure 4:
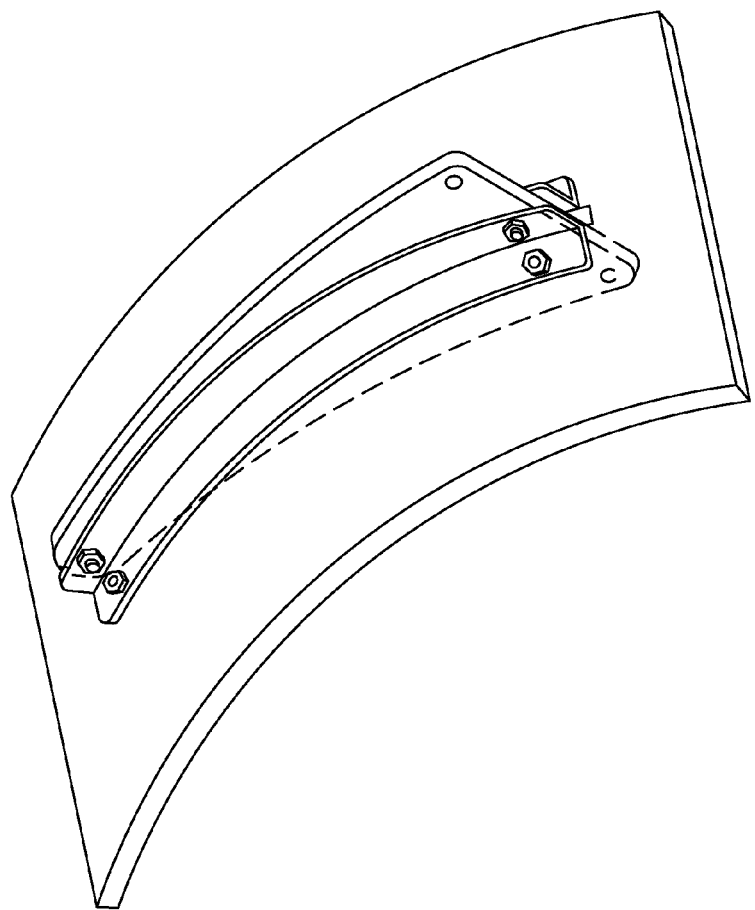
FIG. 4 is a perspective view of a single vane in accordance with some embodiments described herein.

As shown in FIGS. 4 and 5, a housing is affixed to the rotor cover. The housing comprises a base portion configured to engage the curved surface of the rotor cover ensuring a good fit. The housing also has side walls defining an aperture through which a planar vane is housed for movement within. In some embodiments, the housing is a two-piece construction defining the aperture between the two pieces. At one end of the housing, the planar vane is pivotally secured via a bolt or other fastener. At the opposite end, the planar vane and the housing are adapted for securing the vane within the housing at a selected depth.

Although the planar vane may take any suitable shape, the end opposite the pivot is preferably arcuate in nature, to minimize any space between the edge of the vane and the housing, to minimize grain loss. Along its longitudinal insertion edge, in some embodiments, the vane will be provided with a curved edge approximating the curvature of the threshing or separating chamber in which it is inserted. It is contemplated that flat or straight edges may also be employed.

The housing is preferably made from cast metal since it will provide the structural positioning and crop loading resistance required to support the vane against the stresses generated by crop flow.

In one embodiment, shown in FIGS. 4 and 5, a series of holes along the edge opposite the pivot point, are provided to accept a positioning pin through one side of the housing, through the planar vane, passing through and secured at the other side of the housing. By pulling the pin, the vane can be easily moved in or out and reinserted in the next available vane position hole, thus changing the transport action of the flowing crop.

In consideration of long term serviceability, it is understood that the combine will likely intake a foreign object which may damage the vanes. In such cases, the cast housing could allow a bolt or other fastener, to be removed allowing the housing to open up and provide additional clearance to remove and replace a bent or distorted cage vane. Because each vane can be adjusted or removed from the exterior of the threshing chamber the vane arrangement described herein could significantly reduce the time to adjust or repair/replace a vane.

In some embodiments, the vane may be moveable in a linear direction substantially in line with the radius of the threshing chamber. Rather than being pivotally secured at one end as in the rotational embodiments, in this embodiment, a planar vane is adapted to slide within a casting and to be secured therein at the desired depth, full insertion, full retraction, or selected points therebetween.

Above, a pin mechanism was described for securing the vane is preselected locations. This arrangement is simple, easy to construct and requires minimal maintenance. Alternative securing means may be employed, including those that would allow for dynamic insertion depths, rather than a few pre-selected depths. For example, in some embodiment, the castings could be modified to act as a clamp, holding the vane in place via pressure, allowing the plate to be slid to any depth within the casting, before it is clamped in place. Bolts, or other means, passing through the casting, but not the vane could be used to clamp the casting onto the vane at the desired depth.

Although the vane could be curved, angular, or other shape rather than planar, the planar geometry described in further detail herein permits a simple design including an essentially straight slot in the threshing chamber through which the vane is adjustably displaced. With other vane geometries, the corresponding slot and support housing will complement the vane geometry to allow adjustable displacement and support of the vane within and through the slot in the threshing chamber. Some embodiments provide such non-planar vanes and corresponding structures.

Regardless of the shape of the vane, one concern is loss of valuable grain through the aperture that allows movement of the vane into and out of the threshing chamber. In some embodiments, the housing and/or the chamber wall can be provided with a flexible grommet, such as a rubber grommet, which flexibly engages the surface of the vane, but allows the vane to move into and out of the chamber, while effectively sealing the aperture against grain loss.

As described herein, the speed with which material passes through the thresher is controlled at least in part by the depth of the vanes. Accordingly, we have described the situation each vane is depth adjustable. Presently, vanes are typically angled at about 30 degrees from the axis of rotation. As describe above, the angle has been changed, with difficulty to alter crop speed. In some embodiments of the invention herein, the angle of the vane is also adjustable.

In some embodiments, the angel is adjustable to about 30 degrees plus or minus 10 degrees with respect to the axis of rotation of the thresher. In some embodiments, the angle is 20 degrees plus or minus about 10 degrees. Any suitable angle and range of angular adjustment may be achieved.

In some embodiments, each vane is also angularly adjustable. To accomplish this, the rotor cover is provided with a plurality of slots, corresponding to each directional vane. In some embodiments, the housing (i.e. vane holder) is provided on the exterior of the rotor cover to support and secure the vane in its desired position. In some embodiments, the entire casting is rotatable for securing at a desired angular displacement. The vane holder provides the necessary strength to hold the vane at its selected depth and against the flow of crop through the chamber. In other embodiments, the housing provides for angular displacement of the vane within the housing, for example, by providing for angular displacement of its sidewalls with respect to the portions engaging the rotor cover.

In some embodiments of the invention, a threshing chamber is provided with a plurality of depth adjustable vanes for facilitating crop transport.

In some embodiments, a threshing chamber is provided with both depth adjustable and stationary vanes.

By providing different sequences of adjustable and stationary vanes, different effects can be seen. For example, with some materials and under certain conditions, it might be favorable to have stationary vanes at the front of the threshing chamber and adjustable vanes at the back end. Those skilled in the art will readily recognize advantages of placement of the vanes at various locations throughout the threshing chamber.

Figure 6:
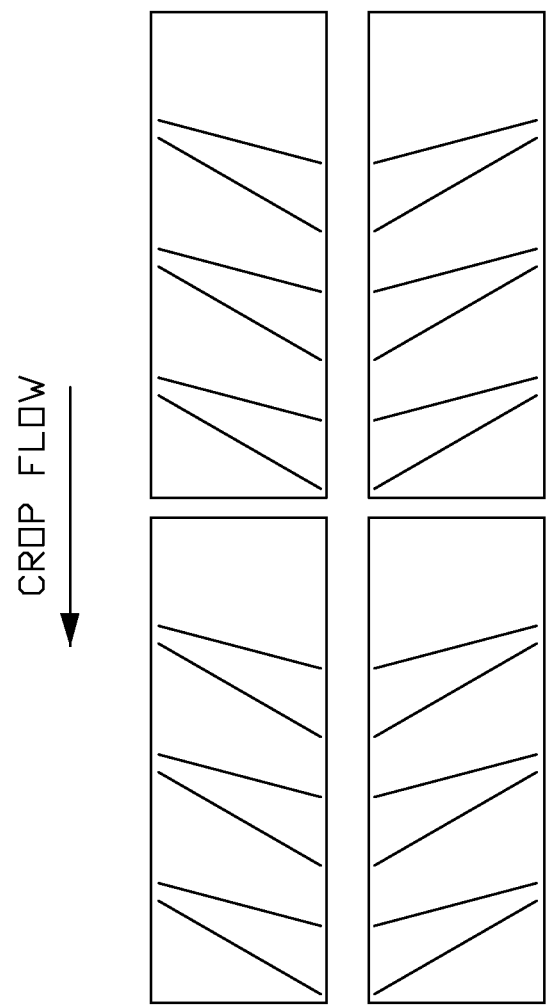
FIG. 6 is a schematic representation of one exemplary layout of crop transport vanes in accordance with some embodiments.

In some embodiments, multiple rows of adjustable and stationary vanes are provided. These rows may alternate, or may be present in groups of adjustable vanes followed by groups of stationary vanes. In some embodiments, the pitch angle a of the vanes may vary from row to row. In some embodiments, the threshing chamber and separating chamber will have differing arrangements of crop transport vanes. FIG. 6 shows one arrangement wherein the pitch angle of alternating rows differs in both the threshing and separating chambers. In such an arrangement, each vane can be independently adjustable with respect to depth and angle, or only selected rows, e.g. every other, may be adjustable with the other remaining stationary. In some embodiments, multiple rows of stationary vanes alternate with multiple rows of adjustable vanes. The possibilities are nearly limitless, and allow for great flexibility in design depending on many factors, including grain, geography, etc. where the combine is to be used.

In some embodiments, each crop vane row may comprise a single adjustable crop vane (as shown), or may comprise a plurality of shorter vanes arranged to complete a single row (not shown).

As described above, each individual vane can be adjusted manually with respect to either or both of insertion depth and pitch angle. To save time and increase safety, it would be beneficial to change the arrangement of the crop transport vanes with a single lever or perhaps via an automated actuator.

Figure 7A:
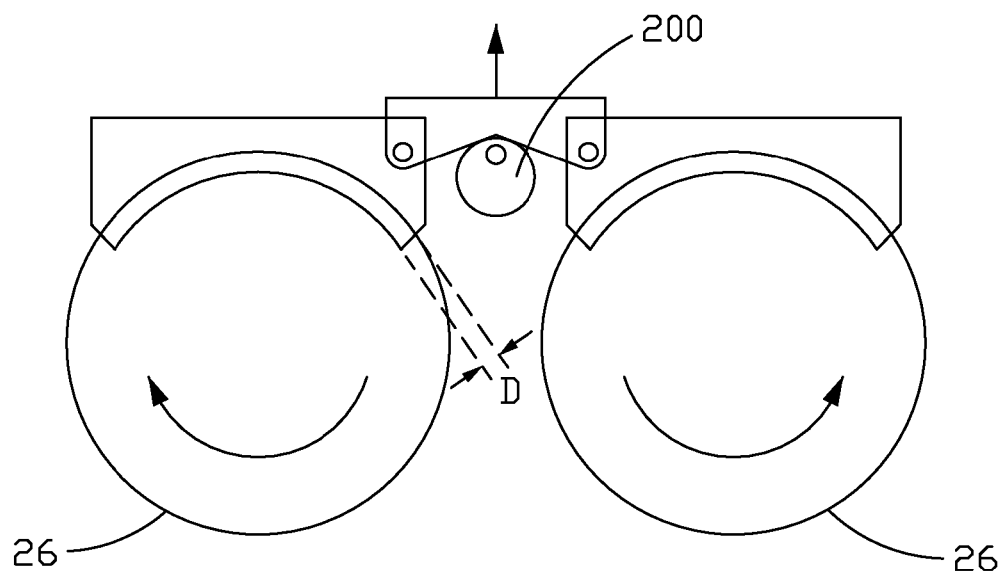
FIG. 7a is a schematic view of an arrangement for adjusting a crop transport vane with the crop vanes in an inserted position in accordance with some embodiments of the invention.
Figure 7B:
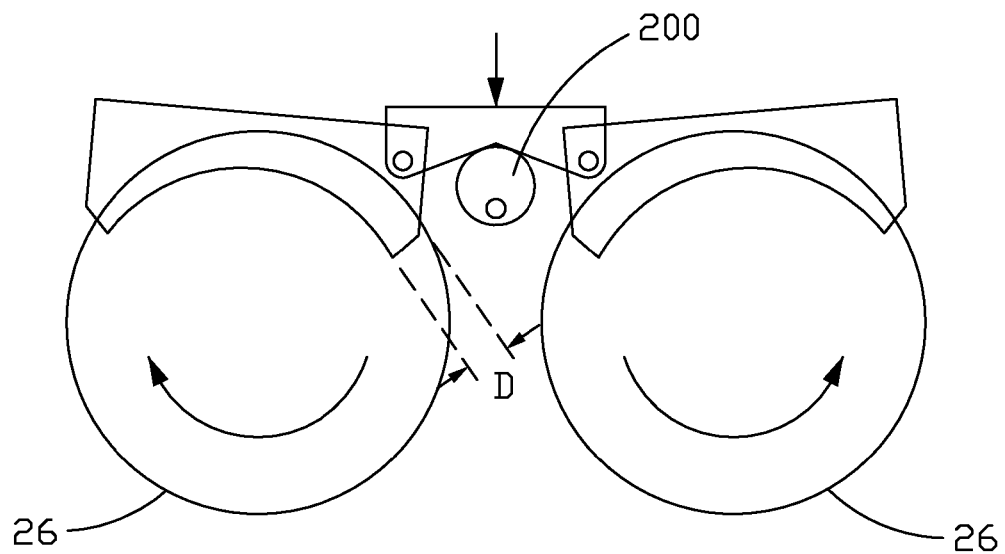
FIG. 7b is a schematic view of an arrangement for adjusting a crop transport vane with the crop vanes in a retracted position, in accordance with some embodiments of the invention.

With respect to depth adjustments, vane depth can be regulated for all vanes at the same time on the two rotors by e.g. rotating an eccentric shaft placed in between the two rotors 26. FIG. 7 shows a schematic view of such an arrangement. Through rotation of the eccentric shaft 200, vane depth D can be adjusted between a fully retracted position, as seen in FIG. 7a and a fully inserted position as seen in FIG. 7b, or at any point therebetween. As noted above, the fully retracted position leads to reduced transport speeds and a fully inserted position leads to increased transport speeds. In some embodiments, a middle position may be calibrated to be suitable for average conditions. For example, full retraction might be suitable for an easy to thresh crop, whereas inserting adjustable vanes e.g. 9 mm one has an intermediate crop and by inserting completely e.g. 18 mm one could deal with the hard to thresh crop.

Adjustment via rotation of the excentric shaft could be done via a lever beam having at least three positions (out, medium, full). The action could also be automated, and in some embodiments, could be automatically and continuously regulated by sensing conditions within the threshing and separating assembly.

As described above, the vanes in the threshing zone and separation zone could be under a different angle and if required could be inserted at different heights independently using two different lever beams or actuators to independently drive two eccentric shafts. The inventors note, however, that with greater adjustably can also come greater incidence of incompatibility of the adjustments. The more complicated the adjustments become, the greater the need for automated or mechanical controls which prevent or limit the various combinations to avoid contradictory settings.

In some embodiments, the crop transport vanes could be placed on the concaves (threshing and separation) rather than on the rotor covers.

Some embodiments of the invention comprise an agricultural combine including the adjustable vanes described herein.

Some embodiments of the invention comprise a threshing and separating assembly comprising one or more adjustable vanes as described herein.

Some embodiments of the invention comprise a threshing chamber comprising one or more adjustable vanes as described herein.

Some embodiments of the invention comprise a separating chamber comprising one or more adjustable vanes as described herein.

What is claimed is:

1. A crop transport vane assembly for a threshing chamber comprising:

at least one housing that houses a planar transport vane, the housing having side walls that define a slot through a generally cylindrical rotor cover the planar transport vane being sized and configured for insertion into and through said slot between a secured deployed position and a secured undeployed position and one or more secured positions therebetween;

the generally cylindrical rotor cover with the at least one slot passing therethrough and arranged either as at least one ring or a helix extending along at least a portion of the length of the generally cylindrical rotor cover, a rotor that is covered by the generally cylindrical rotor cover, the rotor threshes and separates received crops; and the threshing chamber with an eccentric shaft that is connected to the planar transport vane, wherein rotation of the eccentric shaft results in displacement of the planar transport vane for remote adjustment of a depth of the crop transport vane through the slot, in a range between the secured deployed position and the secured undeployed position.

2. The crop transport vane assembly of claim 1, wherein said sidewall is provided with a locking mechanism that holds the planar transport vane at a desired position.

3. The crop transport vane assembly of claim 2, wherein the planar transport vane defines an inner edge which approximates a curvature of the threshing chamber.

4. The crop transport vane assembly and of claim 1, wherein said planar transport vane is pivotally attached within said slot to one end of the housing; wherein the planar transport vane is adapted to be secured to the housing, at an opposite end, at an adjustable depth.

5. The crop transport vane assembly of claim 1, wherein said planar transport vane is displaceable radially within and through said housing with respect to the central axis of the threshing chamber.

6. The crop transport vane assembly of claim 2, wherein said locking mechanism comprises a series of holes at an adjustable end of said vane, each hole corresponding to a desired position, in combination with a corresponding hole in the housing sidewall and a locking pin which may be removably secured within one of the series of holes in the vane and the hole in the housing.

7. The crop transport vane assembly of claim 2, wherein said locking mechanism comprises a clamp for securing the planar transport vane at a desired location within the housing.

8. A threshing chamber comprising:
   a generally cylindrical rotor cover having a plurality of slots passing therethrough and arranged either as a plurality of rings or as a helix extending along at least a portion of the length of the generally cylindrical rotor cover;
   a crop transport vane assembly comprising:
      a housing that houses a planar crop vane, the housing having sidewalls that further define the plurality of slots through the housing,
      a planar crop vane that is positioned at a corresponding slot of said plurality of slots for selective displacement of the planar crop vane therethrough between a secured undeployed position and a secured deployed position and one or more secured positions therebetween; and
      an eccentric shaft connected to the planar crop vanes wherein rotation of the eccentric shaft results in displacement of the planar crop vane for remote adjustment of a depth of the crop transport vane through the corresponding slot.

9. The threshing chamber of claim 8, wherein the planar crop vane comprises:
   an inner edge, wherein said inner edge approximates the curvature of the inside diameter of the cylindrical rotor cover;
   wherein said planar crop vane is positioned wherein at least a portion of said inner edge is selectively displaceable inwardly extending through said sidewall to a desired depth.

10. The threshing chamber of claim 9, wherein the planar crop vane is selectively displaceable inwardly extending through said sidewall wherein at least a portion of said planar crop vane extends to a desired depth of approximately 0 inches to approximately 3 inches.

11. The threshing chamber of claim 8, wherein the planar crop vane defines an inner edge, an outer edge, and two side edges;
   wherein said inner edge approximates the curvature of the inside diameter of the cylindrical rotor cover; wherein at least a portion of said inner edge is selectively displaceable inwardly extending through said sidewall to a desired depth.

12. The threshing chamber of claim 8, wherein said planar crop vane is displaceable in a radial direction, with respect to the center axis of the cylindrical rotor cover.

13. The threshing chamber of claim 8, wherein an adjustable end of said vane comprises an arcuate shape such that as the vane rotates within its corresponding slot, the adjustable end is maintained within close proximity to the edge of the slot.

14. The threshing chamber of claim 8, wherein a plurality of crop transfer vanes are connected to the eccentric shaft for simultaneous, remote adjustment of the depth of the plurality of crop transport vanes.

15. The threshing chamber of claim 8, wherein the eccentric shaft is rotatable via either a mechanical linkage, or a motor.

* * * * *